(12) United States Patent
Bress et al.

(10) Patent No.: US 11,113,227 B2
(45) Date of Patent: Sep. 7, 2021

(54) ERASING DEVICE FOR LONG-TERM MEMORY DEVICES

(71) Applicants: Steven Bress, Germantown, MD (US); Mark Joseph Menz, Folsom, CA (US)

(72) Inventors: Steven Bress, Germantown, MD (US); Mark Joseph Menz, Folsom, CA (US)

(*) Notice: Subject to any disclaimer, the term of this patent is extended or adjusted under 35 U.S.C. 154(b) by 0 days.

(21) Appl. No.: 16/843,388

(22) Filed: Apr. 8, 2020

(65) Prior Publication Data

US 2020/0327086 A1 Oct. 15, 2020

Related U.S. Application Data

(60) Provisional application No. 62/831,722, filed on Apr. 10, 2019.

(51) Int. Cl.
*G06F 13/40* (2006.01)
*G06F 13/42* (2006.01)
*G06F 13/16* (2006.01)

(52) U.S. Cl.
CPC ...... *G06F 13/4068* (2013.01); *G06F 13/1668* (2013.01); *G06F 13/4282* (2013.01); *G06F 2213/0042* (2013.01)

(58) Field of Classification Search
CPC ............. G06F 13/4068; G06F 13/1668; G06F 13/4282; G06F 2213/0042
See application file for complete search history.

(56) References Cited

U.S. PATENT DOCUMENTS

| 7,228,379 | B2* | 6/2007 | Bress | G06F 3/0607 |
| | | | | 711/105 |
| 9,479,335 | B2* | 10/2016 | Zachey | H04L 9/3226 |
| 2010/0138619 | A1* | 6/2010 | Benavides | G06F 21/6218 |
| | | | | 711/159 |
| 2010/0262817 | A1* | 10/2010 | Edmiston | G06F 21/80 |
| | | | | 713/2 |
| 2012/0303920 | A1* | 11/2012 | Thorsen | G06F 21/6218 |
| | | | | 711/166 |

(Continued)

OTHER PUBLICATIONS

Dern, Daniel P.; "Sanitize your hard drives with Drive eRazer Ultra"; Feb. 1, 2012; accessed at URL <https://computerworld.com/article/2500549/sanitize-your-hard-drives-with-drive-erazer-ultra.html>. (Year: 2012).*

(Continued)

*Primary Examiner* — Glenn A. Auve

(57) ABSTRACT

A new long-term memory erasing device, referred to as EasyClean, has been invented. In general, EasyClean is a stand-alone, dedicated function device which is designed for an untrained user, who is tasked with removing data from one or more long-term memory storage devices located in one or more computing devices (targets). EasyClean provides one or more target devices with bootable code. After a target is booted, EasyClean communicates with the target device and monitors the status of the data removal operation. EasyClean may communicate this status to the user. EasyClean may generate an Audit Trail and provide it to the user. EasyClean may accept input from a user, such as what type of data removal to perform. EasyClean may write data to a storage device after the data removal operation is complete.

22 Claims, 5 Drawing Sheets

Block Diagram
USB Embodiment, One Cable, One Target

(56) References Cited

U.S. PATENT DOCUMENTS

| | | | | |
|---|---|---|---|---|
| 2015/0106562 A1* | 4/2015 | Helmer | ............... | G06F 3/061 |
| | | | | 711/114 |
| 2015/0309925 A1* | 10/2015 | Casperson | ............ | G06F 21/80 |
| | | | | 711/103 |
| 2018/0082066 A1* | 3/2018 | Munjal | ................. | H04L 41/28 |
| 2018/0307851 A1* | 10/2018 | Lewis | ................. | G06F 21/62 |
| 2018/0329629 A1* | 11/2018 | Hajrullahu | ............ | G06F 3/0604 |

OTHER PUBLICATIONS

O'Grady, Jason D.; "Review: Wiebetech Drive eRazer Ultra (Verdict: sweet!)"; Feb. 20, 2012; accessed at URL <https://www.zdnet.com/article/review-wiebetech-drive-erazer-ultra-verdict-sweet/>. (Year: 2012).*

"How-To: Wipe a Hard Drive (DBAN)"; tom's Hardware; Feb. 4, 2015; accessed at URL <https://forums.tomshardware.com/faq/how-to-wipe-a-hard-drive-dban.2166893/> (Year: 2015).*

Standalone Hard Drive Eraser & USB 3.0 Dock (SDOCK1EU3P) Instruction Manual; Startech.com; Nov. 27, 2015. (Year: 2015).*

Portable 1:5 USB Flash Drive Duplicator and Eraser (USBDUP15) Instruction Manual; Startech.com; Jul. 23, 2014. (Year: 2014).*

\* cited by examiner

ERASING DEVICE FOR LONG-TERM MEMORY DEVICES

BACKGROUND OF THE INVENTION

A. Field of the Invention

The present invention relates to digital memory devices, and more specifically, to means for erasing data from digital memory devices.

B. Description of Related Art

Corporate computers may be leased. At the end of the lease period the computers are returned to the leasing company. Corporations may purchase computers and desire to recycle them at the computer end of corporate life. In both these cases, a corporation may be tasked with erasing long-term memory on a plurality of computers. There is a benefit that this task to be performed with limited technical training. There is a further benefit that this task has the ability to generate an audit trail, so there is verification that the long-term memory is erased.

There are currently two general methods for erasing data from digital memory devices known in the art; software run on an operating computer, and independent hardware devices.

An example of an independent hardware device is inventor's U.S. Pat. No. 7,228,379 (hereinafter called '379). '379 requires physical access to a long-term memory device. Physical access to a personal computer hard drive requires a moderate amount of training. Some laptop's long-term memory devices may be soldered to a motherboard. This makes removing the memory device from the laptop without damaging the laptop, problematical even for a skilled technician. Some devices may have memory soldered to a motherboard, so there is no actual drive to remove. Additionally, there are long-term memory devices in mobile devices which '379 does not address.

Software solutions require a computing device with a functioning operating system. In general there is a problem with software solutions as they depend on a user acquiring the proper software and using it properly. There have been instances where supposed software cleaners have installed malware. There is an additional problem in that if a long-term memory device is partially erased and the system crashes, a user may be unaware that the memory device is not erased and not have a means to continue to erase the device.

The discussion above is merely provided for general background information and is not intended to be used as an aid in determining the scope of the claimed subject matter.

As can be seen from the above discussion there is a need in the art for additional methods to erase long-term memory devices.

SUMMARY

A new long-term memory erasing device, referred to as EasyClean, has been invented. In general, EasyClean is a stand-alone, dedicated function device which is designed for an untrained user, who is tasked with erasing one or more long-term memory storage devices located in one or more computing devices (targets). Some embodiments of EasyClean have no dependency on a connection to the Internet, which allows an EasyClean device to be used in a secure environment. Some embodiments of EasyClean do not require a functional operating system on a Target Device. Some embodiments of EasyClean may provide a user with an Audit Trail. Some embodiments of EasyClean may communicate with a user with information such as current status of operations. Some embodiments of EasyClean may allow a user to select what level of memory removable should be used, such as NSA secure, simple overwrite, or self-wipe. Some embodiments of EasyClean may write data to a cleaned drive.

In general EasyClean comprises:
1. means to communicate with one or more target devices,
2. means to provide bootable code to one or more target devices,
3. means to communicate with a target device after said target device has booted from the bootable code, and
4. means to communicate with a user.

Additionally, EasyClean may have means to accept input from a user.

In one embodiment, EasyClean is directed towards communicating with a target device through one USB cable. In operation, a user powers up the EasyClean device, connects a USB cable from the EasyClean device to a Target device. The user then powers up the Target device and instructs the Target device to boot to EasyClean. EasyClean then initiates data removal operations.

EasyClean consists of one or more hub modules. Each hub module consists of a USB hub, a mass storage device connected to the hub, a USB to Serial module connected to the hub and a USB port connected to the USB hub. A processor unit is connected to the USB to Serial module on each hub module. Additionally, EasyClean is housed in an enclosure. Each hub module can perform data removal operations on one target device.

In another embodiment, EasyClean is directed towards communicating with a target device through two USB cables. In operation, a user powers up the EasyClean device, connects two USB cables from the EasyClean device to a Target device. The user then powers up the Target device and instructs the Target device to boot to EasyClean. EasyClean then initiates data removal operations. EasyClean consists of one or more interface modules. Each interface module consists of, a mass storage device connected to a first USB port, a USB to Serial module connected to a second USB port. A processor unit is connected to the USB to Serial module on each hub module. Additionally, EasyClean is housed in an enclosure. Each interface module can perform data removal operations on one target device. A two cable embodiment is less expensive to manufacture, but requires a target device with two working USB ports.

In another embodiment, EasyClean is directed towards communicating with a target device through an Ethernet cable. In operation, a user connects an Ethernet cable from the EasyClean device to a target device. The user instructs the target device to boot from EasyClean. EasyClean then initiates data removal operations. EasyClean consists of one or more Ethernet Processor modules. Each Ethernet Processor module consists of, an Ethernet port logic and circuitry configured to provide bootable code to a target connected to the Ethernet port, and a long term memory storage device connected to the logic and circuitry. Additionally, EasyClean consists of a processing module connected to the logic and circuitry of an Ethernet Processor module. Additionally, EasyClean is housed in an enclosure.

In another embodiment, EasyClean may communicate with a user as to the status of data removal operations.

In another embodiment, EasyClean may accept input from a user.

In another embodiment, EasyClean may generate an Audit Trail of data removal operations.

In another embodiment, EasyClean may write data to a cleaned drive.

DETAILED DESCRIPTION

Overview

Figure 1:
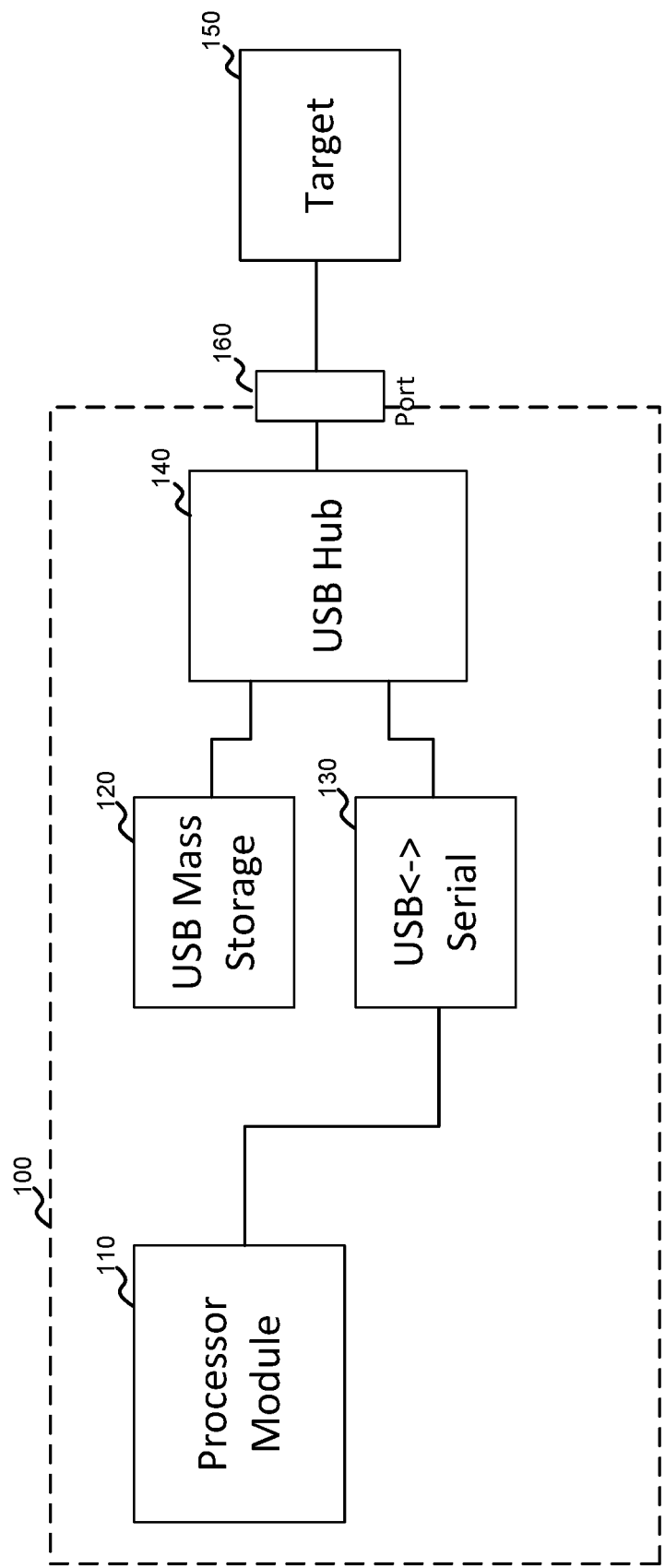
FIG. 1 depicts a block diagram of an EasyClean USB Embodiment with one cable and one Target.

In general, the EasyClean device is directed at removing data from a long-term memory storage device incorporated in a computing device without a user having to physically interact with the long term memory storage device.

In general, the computing device is directed by a user to boot to an interface connected to EasyClean. EasyClean transfers boot code (Payload) to the computing device (Target). The Payload has the ability to remove data from one or more long-term memory storage devices in the computing device and the ability to communicate with the EasyClean device. The EasyClean device may also have the ability to communicate with additional Targets.

Thus the EasyClean device delivers known code to the computing device so that a user is assured that data is removed in a known and proper manner. Additionally, the EasyClean device may have the ability to generate an audit trail, and thus, a user is able to track and verify the data removal process. Additionally the EasyClean device may have the ability to write data to the newly cleaned storage device.

Definitions

Cleaning refers to removing data from a long term memory storage device.

Target Device refers to a computing device with a long term memory storage device that a user desires to clean.

Payload refers to computing device boot code

Stand-alone, dedicated function device is a way of describing a device as different than a typical PC.

USB Device Converter refers to circuitry that is an interface converter between a processor and USB. A USB Device Converter presents itself as a USB Device to a USB Host. The processor side may be a serial interface or a parallel interface. For simplicity of discussion, a USB Device Converter may be referred to as a USB to Serial Converter, as this is the most common form of the interface. A USB Device Converter may be hardware or a combination of hardware and software.

Interfaces

A typical PC has a limited number of ways to transfer data externally at high speeds. These are its external interfaces. Universal Serial Bus (USB) is one of the most common interfaces. USB interfaces can be found on devices ranging from PCs to cell phones, and just about anything in between. It is, at the time of this writing, an extremely common interface.

The actual speed of the USB interface depends on a number of factors, including the version of USB. The version of USB determines the speed of the interface, which is the fastest speed at which it may transfer data. In reality, data cannot be transferred at the highest speed continuously, as there is overhead in the protocol used to transfer data. When discussing external interfaces, the speed used for discussion and comparison is the maximum speed of the interface, which is understood to be a higher number than the true throughput which may be obtained.

The following is a list of external interfaces that may be found on a PC, as of this writing.

| Interface | Speed |
| --- | --- |
| USB 2 High Speed | 480 Mb/s |
| USB 3 | 5 Gb/s |
| USB 3.1 | 10 Gb/s |
| Thunderbolt 3 | 40 Gb/s |
| FireWire 1394b-2002 | 800 Mb/s |
| Ethernet 100 | 100 Mb/s |
| Ethernet 1G | 1 Gb/s |
| Ethernet 10G | 10 Gb/s |

FireWire is a slow, obsolete interface. Thunderbolt is vulnerable to Option ROM attacks. When a system with Thunderbolt boots, it will load and execute Option ROMs from attached devices. A malicious Option ROM can allow malware to execute before an operating system is started.

Most desktop PCs now have at least one Ethernet port and at least one USB port. The speed of each port typically depends on the cost of the system and the speed of its processor. Laptop and tablet computers typically have one or more USB ports and will not often have Ethernet ports. Part of the reason for this is that an Ethernet port may be added as a USB device at any time, with the proper adapter. The actual speed of such an aftermarket Ethernet port cannot exceed the speed of its USB connection to the PC.

EasyClean is directed at erasing data from a long term memory storage device incorporated in a computing device, hereinafter called a Target Device. The Target Device must have an external interface. Additionally, the Target Device must have means for a user to instruct the Target Device to boot to the external interface.

A typical desktop PC allows a user to specify, through its BIOS, which of the attached memory devices should be scanned for information related to booting the system. For example, this allows the user to choose whether to boot the system from a disk attached to a SATA channel, or alternately, from an optical device, such as a CD-ROM. Additionally, most PCs have an option to boot to an external memory device attached through USB, and, occasionally, boot from the Ethernet port.

What goes on behind the scenes to allow for a boot from USB versus a boot from Ethernet are quite different. Long term memory storage devices, such as USB drives, may be connected directly to the USB port. A USB drive is basically made from some form of memory, either magnetic or solid state, with an interface turning it into a USB device. In some cases, the memory may in the form of a removable card, such as an SD memory card. The benefit to the USB based storage is that it is extremely inexpensive to build. Interface chips are available for less than a few dollars that can turn a piece of memory into a USB drive.

Booting from an Ethernet port is a much more complex process. While there are commercially available drives with an Ethernet interface, such as Western Digital's My Cloud storage devices, these do not have the functionality required to get a computer through its boot process using Ethernet. Instead of a Target Device simply reading data off of a memory device, as is the case with a USB booting system, the Ethernet booting system requires that a Target Device connect to a data server. The data server then must provide data, following the appropriate protocols, so that the Target Device may rebuild a boot file to run the program.

This additional server step increases the computational power required to build an EasyClean Ethernet embodiment. In a USB embodiment, virtually any low power, low cost microcontroller can be used to control the system and interact with the user. Additionally, in a USB embodiment, each Target Device has direct, full bandwidth access to its associated memory. This translates into a reduced time between connecting a Target Device and the Target Device being ready to initiate a data removal process. In an Ethernet embodiment, dramatic steps have to be taken to approach the bandwidth available by a USB embodiment.

In terms of speed, Desktop and most laptop computers, if they have an Ethernet port, typically support speeds of either 100 Mb/s or 1,000 Mb/s. (1 Gb/s) While faster Ethernet speeds exist, they are not nearly as common. In terms of USB, most PCs support at least USB High Speed at 480 MB/s, with many machines now supporting USB 3 at 5 Gb/s. Given the lower computational needs in producing a USB based unit along with the generally higher speeds, it is a preferred method. That being said, there are some circumstances, such as found in secure facilities, where a USB solution may not be appropriate. Therefore various embodiments of EasyClean are taught.

Some computing devices may be capable of being booted through a wireless communication method. While it is certainly possible to build an embodiment of the present invention that could work wirelessly, it is not a preferred solution in general. The main problem has to do with security. One of the goals of the present invention is that it can be used by relatively unskilled operators. When all that is required is to set a BIOS entry and plug in a cable, there is little chance for missteps. A wireless embodiment presents a potential security issue. Once a Target is set to boot through a wireless connection, it is theoretically possible for a malicious actor to take control of the Target Device and insert a malicious payload. In this way, a malicious actor could gain access to data on the mass storage device that is supposed to be in the process of being erased.

From the discussion above, one knowledgeable in the art would understand that, as of this writing, the most useful embodiments of an EasyClean device would be a USB or Ethernet embodiment. The following discussion will be directed towards EasyClean USB embodiments and a USB Ethernet embodiment, to illustrate, but not limit, the current invention.

Embodiments of an EasyClean device can be implemented in a variety of ways. The following descriptions are of illustrative embodiments, and constitute examples of features in those illustrative embodiments, though other embodiments are not limited to the particular illustrative features described.

Some of the advantages of an EasyClean device include:
1. EasyClean has no dependency on a connection to the Internet, which allows an EasyClean device to be used in a secure environment.
2. EasyClean does not require a functional operating system on a Target Device.
3. EasyClean can be operated by a relatively untrained user.
4. EasyClean may provide a user with an Audit Trail.
5. EasyClean may communicate with a user with information such as current status of operations.
6. EasyClean may allow a user to select what level of memory removable should be used, such as NSA secure, simple overwrite, or self wipe.

EasyClean USB Embodiments (EasyClean USB)

EasyClean USB requires two communication paths to a Computing Device with a long-term mass storage device to be cleaned. Hereinafter this Computing Device will be described as a Host and/or Target Device.

When USB devices are connected together, only one USB device may act as a USB Host. EasyClean USB requires the Target device to boot from a USB device. Thus the Target device must also be a USB Host.

The first communication path allows for the Target to boot from memory incorporated in EasyClean USB. Typically, this would present a USB interface to the Target which allows it to boot from EasyClean USB's version of a Mass Storage Class device. One knowledgeable in the art would understand that the mass storage class device may be a true mass storage device, such as a thumb drive, or an emulated mass storage device.

The second communication path allows for communication between EasyClean USB and the Target once the Target has booted to EasyClean USB's mass storage device. It is through this path that EasyClean can learn about the specific hardware in the Target device, as well issuing commands and receiving status.

One knowledgeable in the art would understand that two different types of interfaces could be used, USB for booting and Ethernet for command and control. This is not the preferred embodiment for a number of reasons. One is that it assumes that the Target has two functioning ports. Another is that of simplicity. An unskilled worker is more likely to successfully connect a single cable than two. Additionally, as the Target hardware is in an unknown state, it is not always reasonable to assume that all of the hardware on the Target is functional. Additionally, many current computing devices do not have an Ethernet port.

The basic operation of EasyClean USB is as follows. EasyClean is connected to a Target Device's USB port. EasyClean is then powered on. The Target device is then powered on. During the Target Device's boot process, EasyClean appears to the Target as a USB bootable device. A User instructs the Target Device to enter its BIOS (or equivalent) configuration menu, where the Target Device is instructed to boot to the EasyClean, rather than the typical internal drive, such as a SATA connected hard drive or DVD-ROM drive.

The Target is then allowed to boot. The Target takes its programming from memory in EasyClean rather than its own memory system. When the Target has completed its boot sequence, it may analyze the Target and report relevant information back to EasyClean, such as number and types of drives, as well as drive capabilities. EasyClean may allow the User to specify the type of clean to be performed and may display an estimated completion time. Status may be shown on a visual display on the EasyClean device.

EasyClean may maintain a log of each drive cleaned. Information included in the log may contain system identifiable information, drive information, as well as any other info that can uniquely identify the drive. The data may be stored internally in an EasyClean device or in an external long term storage device. The log information may also be printed so that a hardcopy of the report may follow the machine through its processing journey.

The data in the log file may be encrypted for fraud prevention. The data may also carry a hash value with it for validity checks and auditing.

EasyClean may write data to a newly cleaned storage devices. This data may be an operating system, so the target device may be reused after being cleaned.

A USB Processor may either be a USB Host or a USB Device. The USB specification requires that there be only one USB Host among USB connected devices. As of this writing, there are no commercially affordable and available USB Processors that act as a USB Device and can connect with a plurality of USB Hosts. There are some USB Processors that act as a USB Device, but these USB Processors can only connect with one USB Host.

The following embodiments are meant to illustrate, and not limit, the current invention. The embodiments discussed below are the most commercially viable embodiments at the time of this writing. One knowledgeable in the art would understand that other, more expensive embodiments exist, but would not produce a commercially viable product.

One knowledgeable in the art would understand that the following embodiments would require a means to power the processor module and other circuitry. Typically, Easy Clean would be designed to use either an internal or external power supply to run its electronics. However it is also possible for the Target device to provide power for EasyClean. It is not a preferred method in most instances.

Additionally one knowledgeable in the art would understand that enclosing the logic and circuitry in a case would protect the logic and circuitry and make the device easier for a user to operate.

An EasyClean USB Embodiment One Cable, One Target Device

This embodiment has the advantage of being the easiest for a user to operate. Please refer to FIG. 1. A single USB cable from EasyClean 100 USB Port 160 is connected to a Target device 150 by the user. EasyClean is powered on. The Target device is then powered up and the user boots the Target device into a Bios configuration screen. The user then configures the Target Device 150 to boot to a USB port. The Target device 150 then queries devices connected to USB Hub 140. The Target device 150 subsequently finds USB mass storage 120 and boots from code on 120.

There can be only one USB Host in a system. In this embodiment, the USB Host is the Target Device 150. The Processor Module 110 is connected as a USB Device to USB Hub 140 using USB to Serial Module 130. The Serial side of the converter connects to a Serial interface in Processor Module 110.

The Boot Code is also referred to as the EasyClean "Payload." This is code intended to run on the Target Device 150 that allows for mass storage device(s) attached to the Target Device 150 to be cleaned, and allows for communication between the Target Device 150 and Processor Module 110. The Payload may be a program in VXWorks or any appropriate operating system or application. The Payload typically has the ability to operate a large assortment of different types of hardware. This allows EasyClean to clean virtually any type of mass storage device, whether they are SATA, IDE, SAS, IEEE 1394, USB, or any other common type known at the time of design.

In this embodiment, EasyClean 100 has a USB hub 140 built in. A cable from a USB Host port from the Target 150 to is connected to the EasyClean Corn Port 160 which is connected to USB Hub's 140 Device port. A real or emulated mass storage class device 120 is attached to one of the Hub's 140 Host ports. This presents 120 to the Target 150 as a bootable USB drive. Another Host port in EasyClean's hub 140 is connected to EasyClean's processor 110, through an additional interface such as a USB to Serial converter 130. This makes EasyClean 100 a USB device from the point of view of the Target 150. The Hub 140 allows for a simple connection using a single cable between EasyClean 100 and its Target 150.

One knowledgeable in the art would understand that there are other methods to accomplish what the USB to Serial module 130 does, such as a USB to USB bridging cable. A chip based module 130 is the least expensive. While most interfaces between processors are of a serial nature, there are existing interface chips that present as a USB Device and convert USB data into a parallel format. This type of interface would, in some cases, require a different choice in components for the Processor Module 110 than if a serial interface were to be used.

USB Mass Storage 120 may be write protected, either using hardware or software, to ensure that malicious code has not been added or substituted. Additionally, one knowledgeable in the art would understand that there are numerous methods known in the art to verify that the code in 120 is unchanged from its initial state.

Figure 5:
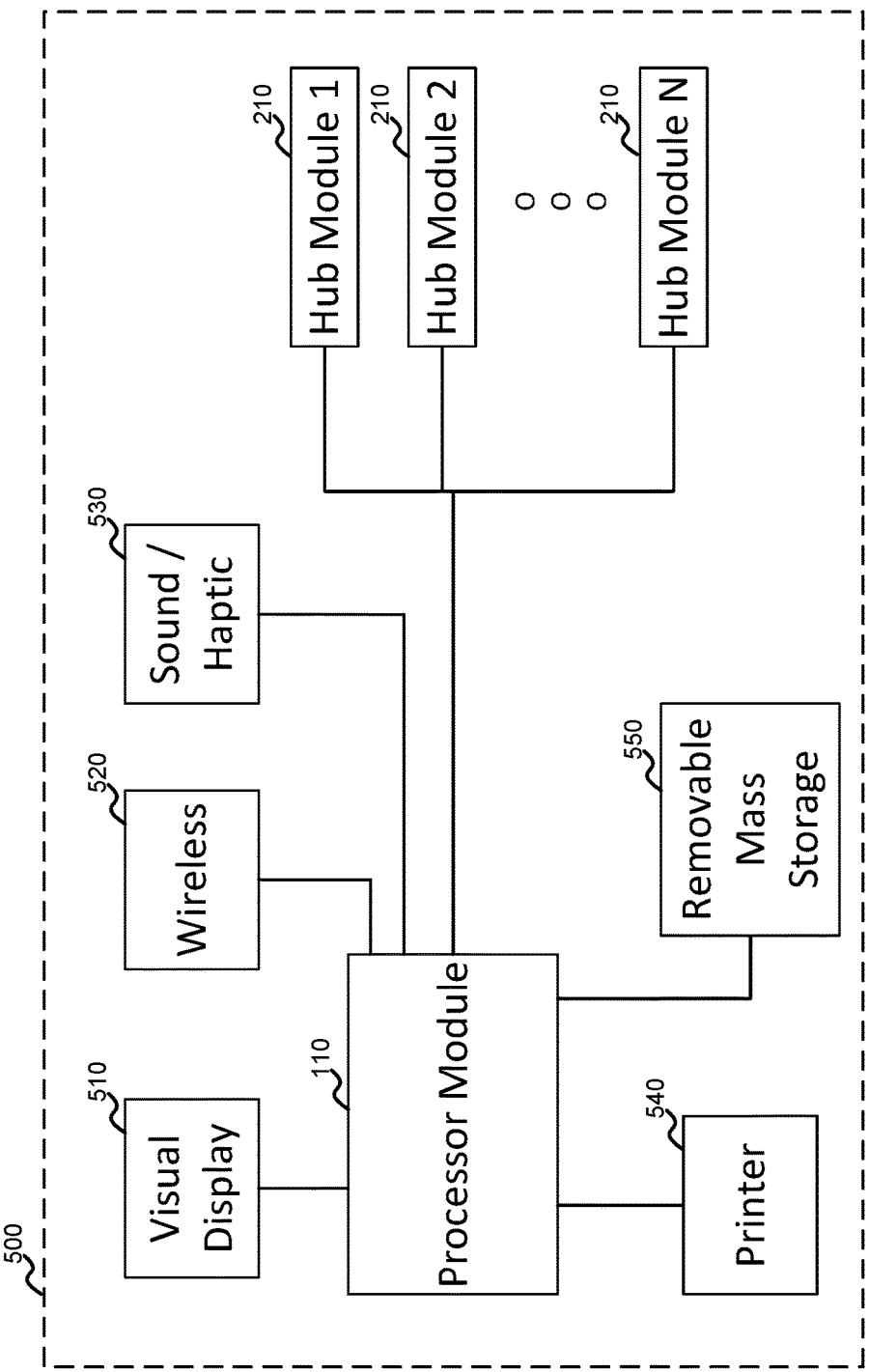
FIG. 5 depicts a block diagram of an EasyClean USB Embodiment with multiple user interface modules.

Please refer to FIG. 5. In additional embodiments, Processor Module 110 may connect to additional user interface modules individually or in any combination, including Visual Display 510, Wireless Communication 520, Sound/Haptic 530, Printer 540 and Removable Mass Storage 550. Additionally, Processor Module 110 may have means to accept input from a user, including but not limited to, a touch display, buttons, switches and wireless communication from a second device such as a smart phone running an EasyClean application.

One knowledgeable in the art would understand that a USB cable could be directly connected to USB Hub 140, thus eliminating the need for USB Com Port 160.

One knowledgeable in the art would understand that if processing module 110 was a USB Device, then the USB to Serial 130 would not be necessary. However, in this embodiment, EasyClean would only be able to connect to one target device. Currently available Processors that present as a USB Device can only connect to one USB Host.

An EasyClean USB Embodiment One Cable, Multiple Target Devices

Figure 2:
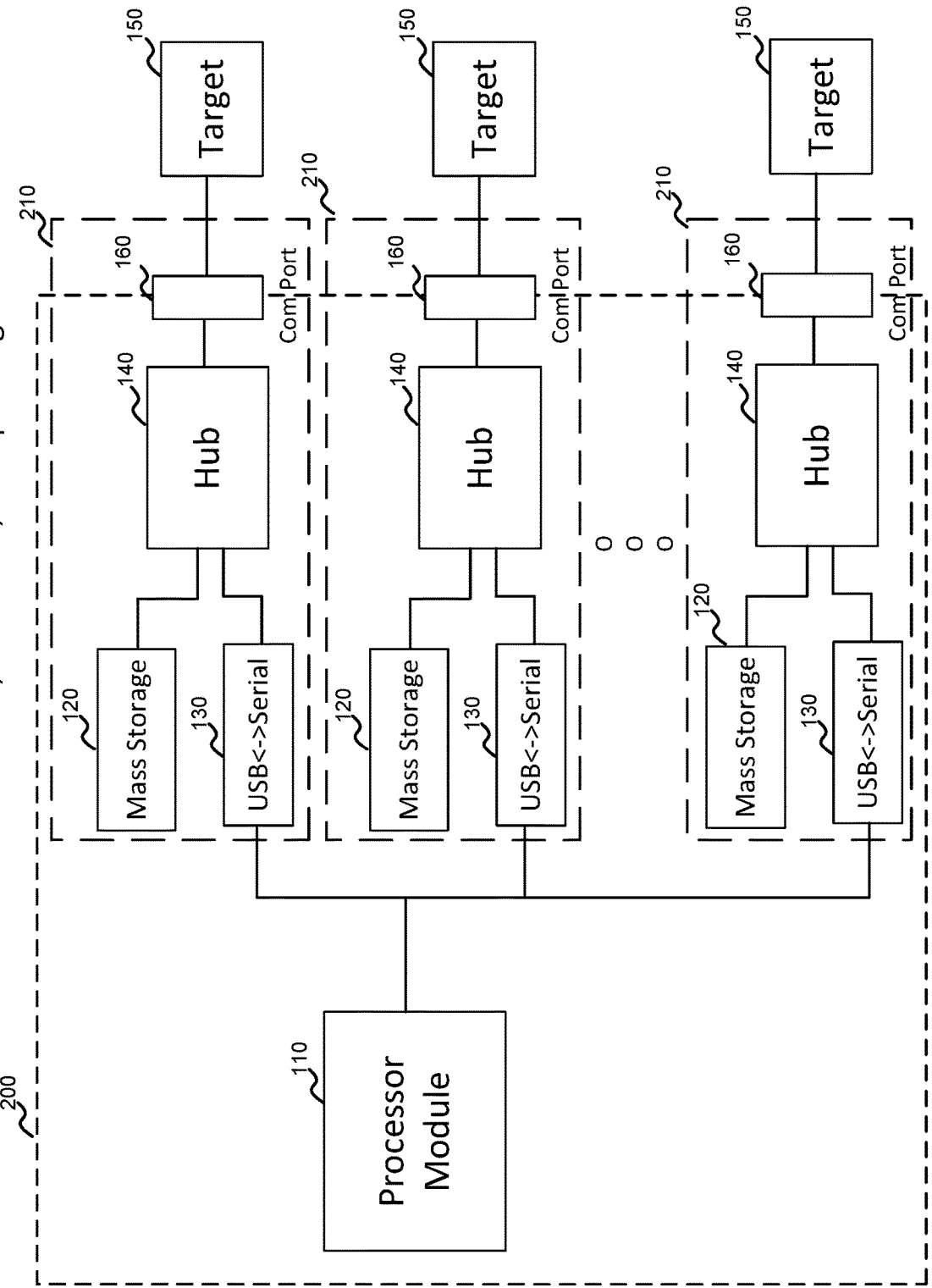
FIG. 2 depicts a block diagram of an EasyClean USB Embodiment with one cable and multiple Targets.

Please refer to FIG. 2. Processing Module 110 is an expensive component of EasyClean. In this embodiment 200 Processing Module 110 is connected to multiple Hub Modules 220. It functions as the embodiment above, except this embodiment has the ability to remove data from multiple Target Devices 150 at the same time.

An EasyClean USB Embodiment Two Cable

Figure 3:
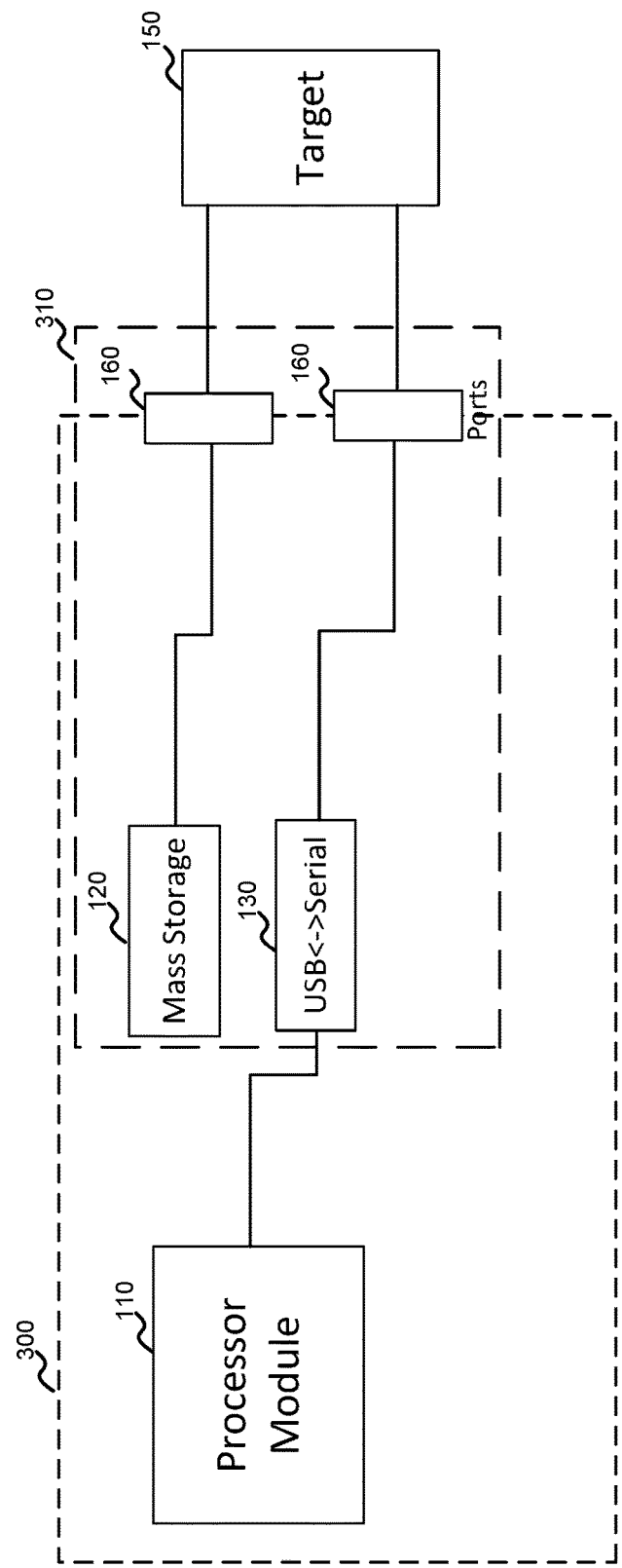
FIG. 3 depicts a block diagram of an EasyClean USB Embodiment with two cables.

Please refer to FIG. 3. An EasyClean USB Embodiment, Two Cable, Single Target 300, is less expensive to manufacture than the EasyClean USB Embodiment, One Cable, Single Target 100 as 300 does not need a Hub Module 140. It does require a Target 150 that has a least two USB ports, which not all devices have.

One knowledgeable in the art would understand that a multiple Target embodiment could be made by having the Processing Unit 100 drive multiple 2-cable Interface Modules 310, similar to 200 above.

An EasyClean Ethernet Embodiment

Figure 4:
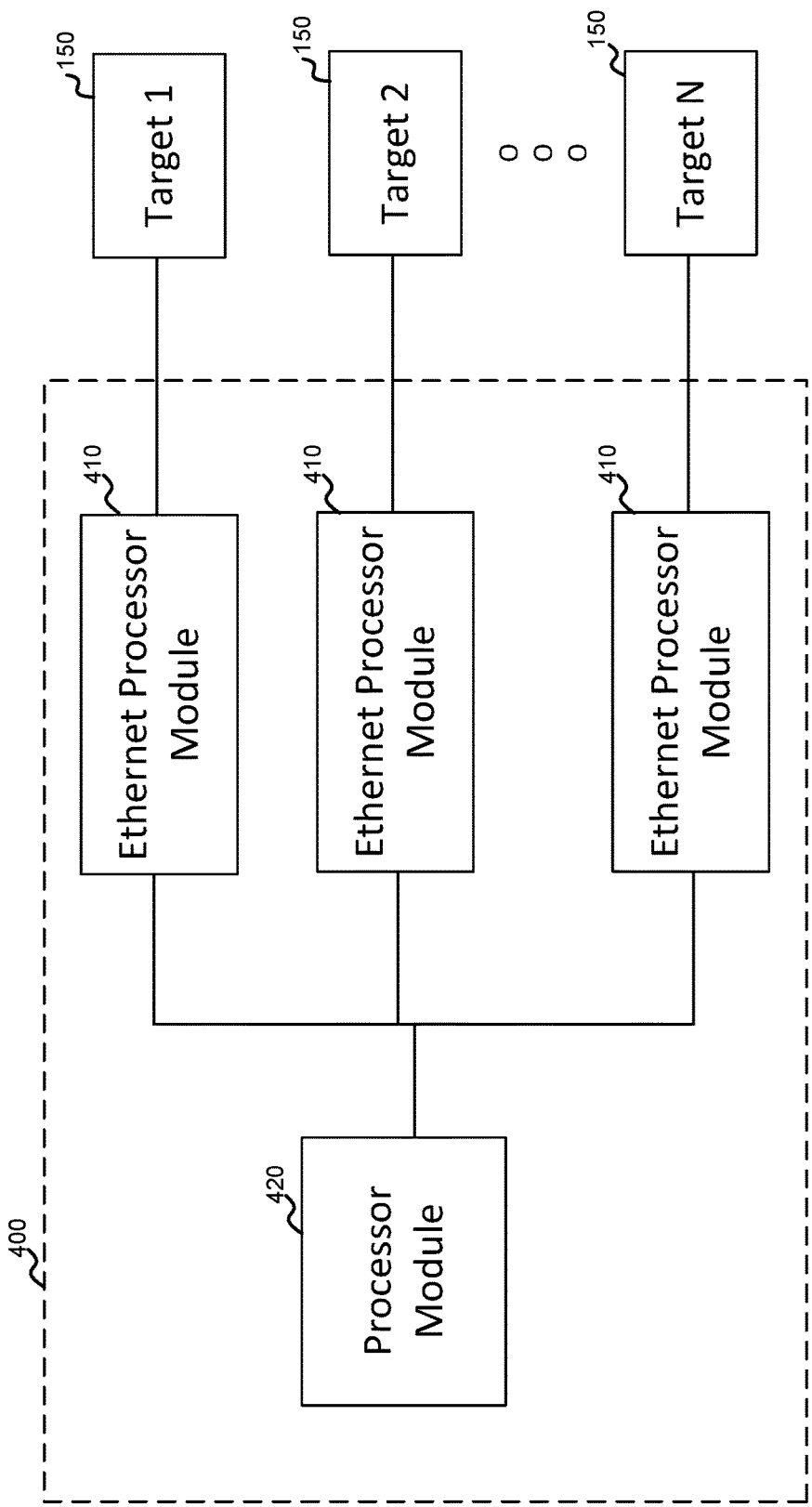
FIG. 4 depicts a block diagram of an EasyClean Ethernet Embodiment.

FIG. 4 illustrates an EasyClean Ethernet embodiment 400. In this example, in order to maintain bandwidth to each target, a dedicated Ethernet Processor Module 410 is used for each connection to a Target 150. The amount of computational power in each module determines the actual maximum transfer speed between the processor module and the Target up to the limitation of the interface.

Each dedicated Ethernet Processor Module 410 has its own long term storage that is large enough to hold a payload that will be delivered to a connected Target on request. Additionally each 410 Module has logic and circuitry to allow a Target 150 to boot to EasyClean Ethernet 400 and to communicate to Processing Module 420. For the sake of simplicity of design, each dedicated Ethernet Storage 410 module is identical to the others. Monitoring the status of the modules, and thereby the state of the connected Target, is handled by the Processor module 420. The Processor module 420 may communicate with a user and may generate an Audit Log. Processor module 420 may not have very significant data processing requirements.

In general, additional user interface embodiments discussed for the USB Embodiments may also be implemented in an Ethernet Embodiment.

EasyClean User Interface Embodiments

After a Target boots with the EasyClean Payload, EasyClean can communicate with the Target. If the device is set for full auto, all of the detected storage devices on the Target may be wiped. If it is set for manual, a User may instruct EasyClean to wipe a specific long-term memory device.

The User may additionally select the type of Wipe that EasyClean should perform, such as NSA secure, simple overwrite, or self wipe.

User feedback is provided through a user interface (UI) as to the cleaning status of each drive currently being wiped. Time estimates may be provided. The accuracy of the estimate varies based on the type of wipe and the health of the drive.

EasyClean may suggest a specific type of wiping pattern to the user depending on the health of the drive. Drive health is typically detected through the use of SMART commands built into the long term storage device.

EasyClean may send messages to a User when a decision is requested or one of the tasks has been completed. One skilled in the art would understand that the messages may take the form of email or instant messages.

In another embodiment, the User may respond to a request from EasyClean using a portable device, such as a Cell Phone.

EasyClean Audit Trail Embodiments

The EasyClean Processing module may maintain an audit trail of operations performed on long-term memory storage devices. This may include: start time and completion time of operations, date of operations, type of clean, identification of target, identification of long-term storage device(s) on target, individually or in any combination. This information may be communicated to a user in the following manner, either individually or in any combination: visual display, audio, haptic, printed, and/or stored as data on a removable mass storage device, and/or sent electronically.

EasyClean Post Wipe Operations

In certain embodiments, after EasyClean has finished wiping the Target's mass storage device(s), one or more additional operations may be implemented. In some cases, an additional method for verifying the wipe status may be desired. In this case, the Target may be instructed to write a specific pattern of bits back to the Target's mass storage device. This can be used by an application for a fast check that the wipe was complete. In another case, it may be desirable to load an operating system into the mass storage device after it has been wiped.

In this embodiment, an image of the operating system may be stored on EasyClean's mass storage for the specific Target. The payload is able to copy this memory onto the Target's mass storage device. This process would allow for a freshly wiped Target to be ready for reuse without requiring an additional technical step.

While it is possible to store the information to be used for Post Wipe Operations in EasyClean's mass storage device, this memory is not necessarily intended to be modified by the user. So that users may provide their own operating system or other information for Post Wipe Operations, an additional embodiment allows for externally supplied mass storage devices, such as, but not limited to, USB drives or SD cards.

It is also possible, with additional circuitry, to allow the Processor Module to modify data stored in the USB Mass Storage for user specified Post Wipe Operations. This is not preferred, as it requires a change in the Mass Storage that holds the Payload and is not entirely without risk to previously stored data.

In the case of a One Cable USB design, an additional Mass Storage device would connect to the Hub circuit. In the case of a Two cable USB design, the additional Mass Storage device would require an additional cable in order to connect to the Target Device.

What is claimed is:

1. A stand-alone, dedicated function device for removing data from one or more target devices, wherein said target devices have one or more digital storage devices, and one or more USB ports, the dedicated function device comprising:
   a. one or more hub modules, each hub module comprising:
      1. means to interface with a USB port on a target device,
      2. a USB hub connected to the means to interface with a USB port,
      3. USB mass storage connected to the USB hub, wherein the USB mass storage is configured to be a bootable device,
      4. a USB Device Converter connected to the USB hub,
   b. a processing module connected to one or more hub modules through the USB Device Converter in the hub module, the processing module configured to communicate with a target that has booted from the USB mass storage in a hub module and further configured to communicate with a user,
   c. a casing configured to contain one or more hub modules and the processing module.

2. The stand-alone device of claim 1 wherein the means to interface with a USB port on a target device is a USB cable connected to the USB hub.

3. The stand-alone device of claim 1 wherein the means to interface with a USB port on a target device comprises: a USB port connected to the USB hub and a USB cable connected to the USB port.

4. The stand-alone device of claim 1 wherein the processing module is configured to communicate with a user by the following, individually or in any combination: visual display, audio device, haptic device, printer, wireless communication to a second device, a removable mass storage device and a communication port.

5. The stand-alone device of claim 1 wherein the processing module is further configured to accept communication with a user.

6. The stand-alone device of claim 5 further comprising a touch screen panel connected to the processing module.

7. The stand-alone device of claim 5 further comprising a wireless module connected to the processing module, the wireless module configured to accept input from a second device.

8. The stand-alone device of claim 1 further comprising means to write data to a digital storage device after data removal processes have been completed on said digital storage device.

9. The stand-alone device of claim 8 further comprising means for a user to specify what data is to be written to a digital storage device after data removal processes have been completed.

10. A stand-alone, dedicated function device for removing data from one or more target devices, wherein said target devices have one or more digital storage devices, and two or more USB ports, the dedicated function device comprising:
   a. one or more interface modules, each interface module comprising:
      1. a first means to interface with a USB port on a target device,
      2. a second means to interface with a USB port on a target device,
      3. USB mass storage connected to the first means to interface with a USB port, wherein the USB mass storage is configured to be a bootable device,
      4. a USB Device Converter connected to the second means to interface with a USB port,
   b. a processing module connected to one or more USB Device Converters, the processing module configured to communicate with a target that has booted from the USB mass storage and further configured to communicate with a user,
   c. a casing configured to contain one or more interface modules and the processing module.

11. The stand-alone device of claim 10 wherein the first and/or second means to interface with a USB port on a target device is a USB cable.

12. The stand-alone device of claim 10 wherein the first and/or second means to interface with a USB port on a target device comprises: a USB port and a USB cable connected to the USB port.

13. The stand-alone device of claim 10 wherein the processing module is configured to communicate with a user by the following, individually or in any combination: visual display, audio device, haptic device, printer, wireless communication to a second device, a removable mass storage device and a communication port.

14. The stand-alone device of claim 10 wherein the processing module is further configured to accept communication with a user.

15. The stand-alone device of claim 14 further comprising a touch screen panel connected to the processing module.

16. The stand-alone device of claim 14 further comprising a wireless module connected to the processing module, the wireless module configured to accept input from a second device.

17. The stand-alone device of claim 10 further comprising means to write data to a digital storage device after data removal processes have been completed on said digital storage device.

18. A stand-alone, dedicated function device for removing data from one or more target devices, wherein said target devices have one or more digital storage devices, and one or more Ethernet ports, the dedicated function device comprising:
   a. one or more Ethernet Storage modules, each Ethernet Storage module comprising:
      1. means to interface with an Ethernet port on a target device,
      2. a memory storage device,
      3. logic and circuitry configured to provide bootable code to a target,
   b. a processing module connected to one or more Ethernet Storage modules, the processing module configured to communicate with a target that has booted from the memory storage device in an Ethernet Storage module and further configured to communicate with a user,
   c. a casing configured to contain one or more Ethernet Storage modules and the processing module.

19. The stand-alone device of claim 18 wherein the processing module is configured to communicate with a user by the following, individually or in any combination: visual display, audio device, haptic device, printer, wireless communication to a second device, a removable mass storage device and a communication port.

20. The stand-alone device of claim 18 wherein the processing module is further configured to accept communication with a user.

21. The stand-alone device of claim 20 further comprising a touch screen panel connected to the processing module.

22. A stand-alone, dedicated function device for removing data from one or more target devices, wherein said target devices have one or more digital storage devices, and one or more communication ports, the dedicated function device comprising:
   a. means to communicate with one or more target devices,
   b. means to provide bootable code to one or more target devices,
   c. means to communicate with a target device after a target device has booted from the bootable code,
   d. means to communicate with a user.

* * * * *